June 5, 1928.  
E. RAFFLOER  
1,672,778  
MEANS FOR DESULPHURIZING GASES  
Filed June 11, 1926
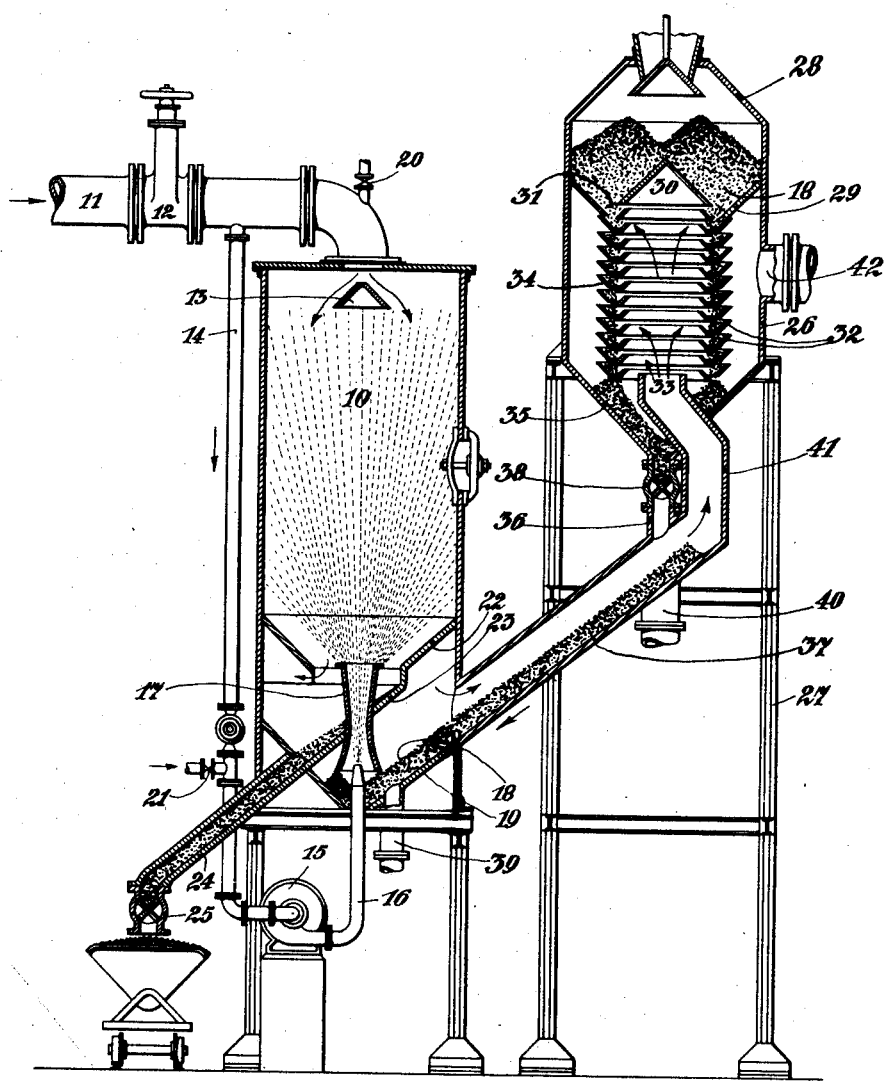
Inventor  
EMIL RAFFLOER,  
By his Attorneys  
Mason, Fenwick & Lawrence.

Patented June 5, 1928.

1,672,778

UNITED STATES PATENT OFFICE.

EMIL RAFFLOER, OF DUISBURG-ON-THE-RHINE, GERMANY, ASSIGNOR OF ONE-HALF TO WM. E. LEUCHTENBERG, OF NEW YORK, N. Y.

MEANS FOR DESULPHURIZING GASES.

Application filed June 11, 1926. Serial No. 115,304.

The primary object of my invention is to provide an apparatus by which the process described in my application for patent No. 446, filed January 3, 1925, may be effectively carried out. Said application has resulted in Patent 1,624,625 issued Apr. 12, 1927.

Another object of my invention is to provide a dry purification means whereby large volumes of gas may be purified in a comparatively small apparatus requiring much less labor than the dry purification plant of usual design.

Another object is the provision of a continuously-operating dry purification means for sulphuretted gases.

In order that the nature of my invention may be clearly understood, I shall first describe in detail the mode in which I at present prefer to carry the invention into practice, and then point out the various features of the invention in the claims.

Reference is to be had to the accompanying drawing forming part of this specification in which the figure represents a vertical section partly in elevation of the present preferred form of my invention.

Numeral 10 designates a desulphurizing chamber which in this case is shown as cylindrical, but may be of any other desired shape, and into which the gas to be purified is introduced by means of a main gas pipe 11 after having been scrubbed in the usual scrubbing plant.

The admission of raw gas is regulated by a valve 12 and the gas is preferably introduced into chamber 10 at the top thereof, and is distributed throughout said chamber 10 by means of a fixed baffle 13 at the gas inlet.

Main gas pipe 11 is preferably provided with a branch pipe 14 which leads to a compressor 15. The gas compressed by compressor 15 is introduced into chamber 10 by means of pipe 16 and nozzle 17 around the mouth of pipe 16. Nozzle 17 is positioned over the end of pipe 16 and contacts at its lower end with a bed of finely divided purifying material 18 such as iron oxide or iron hydroxide on the inverted conical bottom 19 of chamber 10.

The raw gas in its rush through nozzle 17 creates a partial vacuum immediately surrounding the end of pipe 16, and thus draws with it through the nozzle 17 the purifying material 18 and blows same into chamber 10, thus intimately mixing the purifying material with the main stream of raw gas admitted into the chamber through the top thereof.

Though I have shown the raw gas as being introduced into the chamber 10 through the top thereof, it will be understood that it may be introduced at other points in the chamber without departing from the invention.

In order to change the sulphuretted purifying material into an oxide after it has reacted with the hydrogen sulphide in the raw gas, it is necessary to introduce oxygen into the chamber to oxidize the sulphide. To do this I prefer to provide valved air inlets 20 and 21 in the gas pipes 11 and 14, though it will be perceived that other means may also be employed.

The purifying material, after contact with the raw gas and air admitted therewith, is greatly increased in weight due to chemical reactions occurring during the contact, and also because of the coating of sulphur it receives. This increase in weight causes the material to settle down on an inner bottom 22 provided in the chamber 10. This inner bottom is of inverted frusto-conical shape, and is preferably provided with a lower extension 23, which is open at the top thereof to permit the purified gas to escape in the direction indicated by the arrows in the figure. Extension 23 leads into a duct 24 which may be valved as at 25 to control the discharge of the spent purifying material therethrough.

As the bottom of the nozzle 17 must always contact with the purifying material 18 in order to function properly, there must be a constant supply of fresh purifying material. This may be accomplished in various manners, but I prefer to employ the following means:

A filter box 26 preferably mounted on a frame work 27 adjacent chamber 10 is provided with an upper hopper 28 having an inverted frusto-conical bottom 29. A conical baffle 30 of smaller diameter than the opening in bottom 29 is mounted in the bottom opening to form an annular opening 31 for the feeding of the purifying material 18 from the hopper 28 into the filter box 26.

In the filter box 26 are preferably arranged two series of baffles, the outer series 32 being formed of superposed annular members of inverted frusto-conical shape secured to the wall of box 26 in any desired manner and so arranged that the inner circumferences thereof are approximately vertically aligned with the inner circumference of bottom 29.

The inner series of baffles 33 is formed of superposed annular members of frusto-conical shape supported in any desirable manner in the filter box. The inner baffles 33 are preferably so arranged that the outer circumferences thereof are approximately vertically aligned with the outer circumference of the baffle 30.

Thus as the purifying material is fed through the filter box from the hopper 28, it will form a roughly cylindrical stream 34 of loosely packed particles. The bottom 35 of the filter box is preferably of inverted conical shape and leads through pipe 36 to a duct 37, the rate of feeding the purifying material through the filter box and into the duct 37 being controlled in this instance by a valve 38 in pipe 36.

The duct 37 at its lower end opens into the bottom 19 of the desulphurizing chamber 10, so that the purifying material 18 falling into the duct 37 slides by gravity to the bottom of the chamber 10 and so provides a bed of purifying material which always contacts the lower end of nozzle 17.

As it sometimes becomes necessary to remove the purifying material from the bottom 19 of the chamber 10 or from the filter box 26, I provide therein for this purpose outlets 39 and 40 respectively.

The purified gas from the chamber 10 passes through the open top of extension 23 into the duct 37 as indicated by the arrows, and through the extended end 41 of duct 37 into the center of the filter box 26 at the inside of the series of baffles 33. Here the purified gas passes over the individual members of the inner series of baffles 33, through the stream of loosely packed purifying material 34, and over the individual members of the outer series of baffles 32, and finally through an exhaust pipe 42 to a suitable holder. In this manner, any purifying material dust which may be suspended in the purified gas is positively removed.

It will thus be seen that I have provided an improved apparatus for desulphuretting coal gas and other gases in which large volumes of gas may be purified in a comparatively small apparatus requiring much less labor than the ordinary purification plant.

Also, by the intimate contact between the gas and the particles of the purifying material which in this apparatus are caused to expose their whole surface to the gas, a much better purification of the raw gas is obtained.

It is evident that many changes may be made in the specific construction and arrangement described without departing from the boundaries of my invention as defined by the following claims.

I claim as my invention:—

1. A gas desulphurizer comprising a chamber, means for introducing raw gas into said chamber, an induction nozzle entering the lower end of said chamber, a receptacle for purifying material surrounding the lower open end of said nozzle, a pipe rising through the bottom of said receptable into the lower end of said nozzle which leaves an annular space around the pipe, means for forcing a part of the raw gas through said pipe so that the purifying material in the receptacle will be blown into the chamber with the raw gas and mixed with the main body of raw gas entering the chamber and means for leading the treated gas and the purifying material from the chamber.

2. A gas desulphurizer comprising a chamber, means for introducing raw gas into said chamber, separate means for forcing gas at a high pressure into said chamber, a filter box, means for leading a stream of finely divided solid purifying material through the filter box, and thence into the path of the high pressure gas so as to be blown thereby into the chamber, and means for leading the treated gas from the chamber through the stream of purifying material in the filter box.

3. A gas desulphurizer comprising a chamber, means for introducing raw gas into said chamber, a filter box, a series of superposed spaced annular baffles in the filter box to receive and form an annular stream of finely divided purifying material, means for leading the finely divided purifying material from the filter box and blowing it into the chamber, and means for leading the treated gas from the chamber centrally through the annular series of baffles and laterally through the annular stream of purifying material formed thereby.

In testimony whereof I affix my signature.

EMIL RAFFLOER.